No. 663,206. Patented Dec. 4, 1900.
O. M. WOLFF.
FRUIT PITTING MACHINE.
(Application filed June 11, 1900.)
(No Model.) 2 Sheets—Sheet 1.
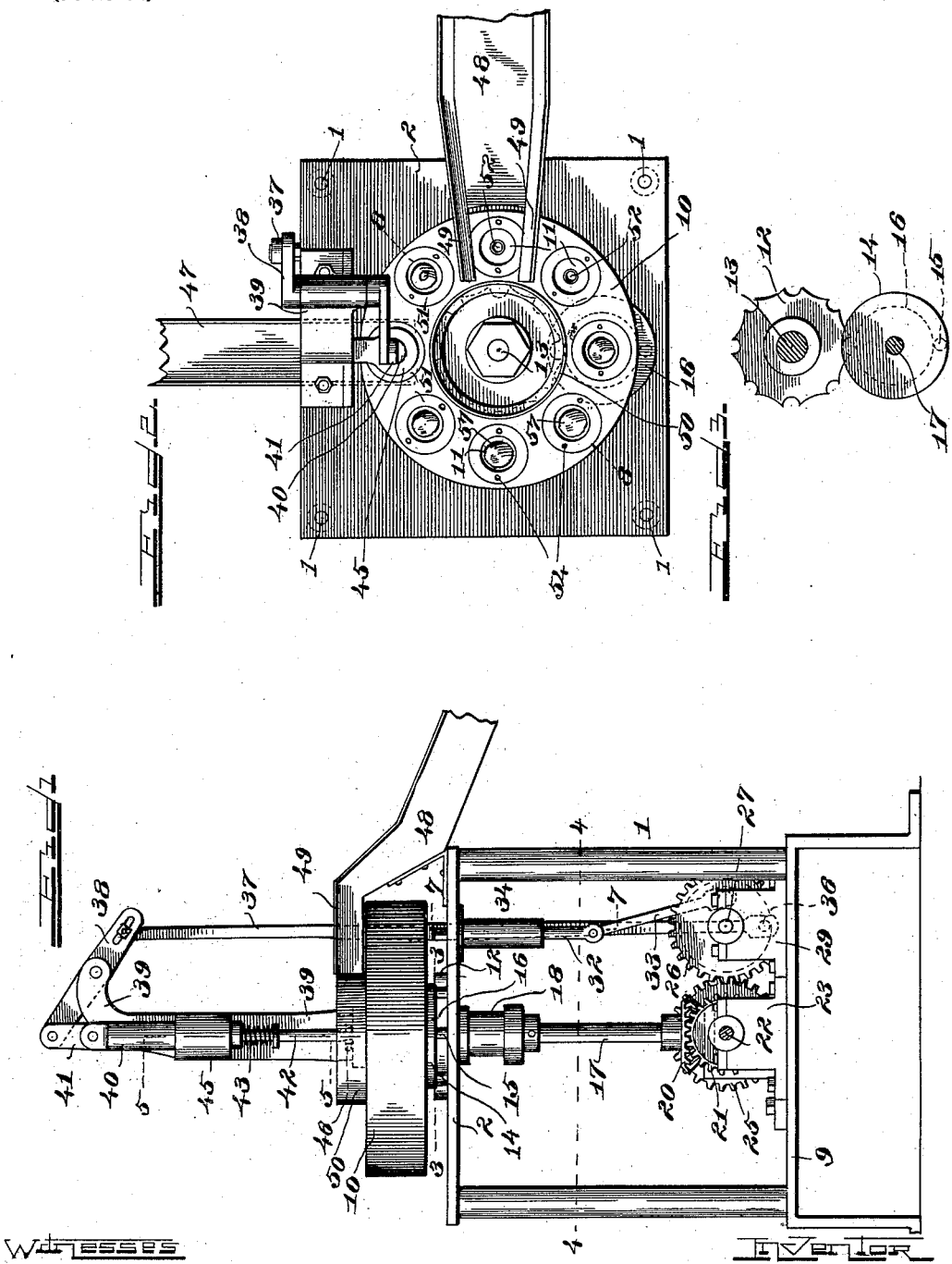

No. 663,206. Patented Dec. 4, 1900.
O. M. WOLFF.
FRUIT PITTING MACHINE.
(Application filed June 11, 1900.)
(No Model.) 2 Sheets—Sheet 2.
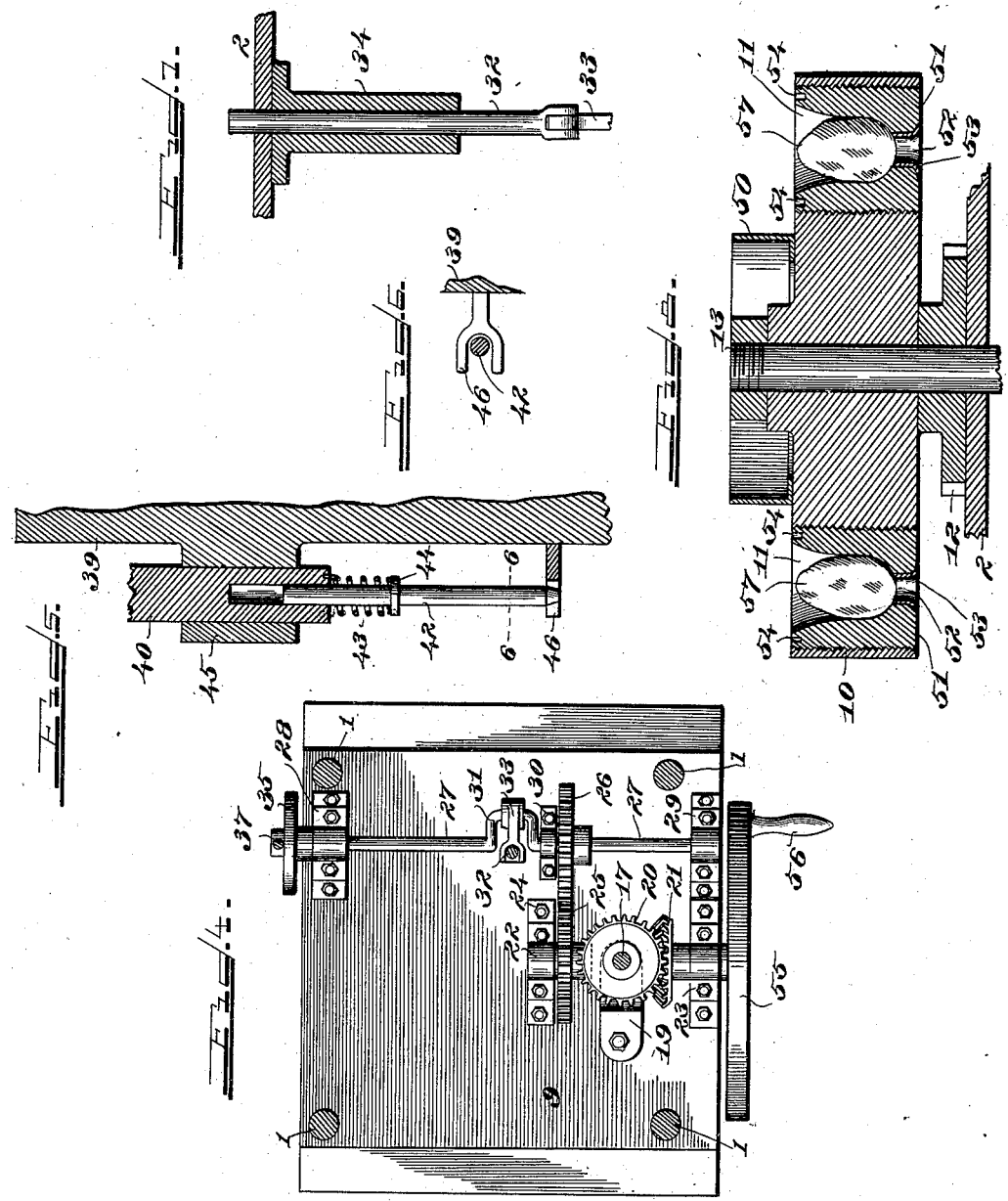

UNITED STATES PATENT OFFICE.

OSCAR M. WOLFF, OF CHICAGO, ILLINOIS.

FRUIT-PITTING MACHINE.

SPECIFICATION forming part of Letters Patent No. 663,206, dated December 4, 1900.

Application filed June 11, 1900. Serial No. 19,820. (No model.)

*To all whom it may concern:*

Be it known that I, OSCAR M. WOLFF, a citizen of the United States of America, and a resident of Chicago, in the county of Cook and State of Illinois, have invented certain new and useful Improvements in Pitting-Machines, of which the following is a specification.

My invention relates to machines for removing the pits or stones from fruit, and particularly to removing same from olives preparatory to filling the olives with some other edible material. Its main objects are to provide improved mechanism for this purpose suitable for a rapid feed of the fruit, to avoid injury to the machine or stoppage when pits of unusual size or shape fail to readily pass through the aperture provided for discharging same, to provide for readily discharging the fruit from the machine, and to provide for handling different lots of fruit of different sizes.

The particular objects of the different parts with which I put my invention into practice will be understood from the following description with reference to the accompanying drawings, in which—

Figure 1 is a front elevation of a machine constructed according to my invention, omitting the driving-wheel and crank shown at the front of Fig. 4. Fig. 2 is a top plan of the structure shown in Fig. 1. Fig. 3 is a horizontal section on the line 3 3 of Fig. 1, showing the gearing for operating the rotary platform. Fig. 4 is a section on the line 4 4 of Fig. 1 and including the driving-wheel which is omitted from said Fig. 1. Fig. 5 is a vertical section on the line 5 5 of Fig. 1. Fig. 6 is a horizontal section on the line 6 6 of Fig. 5. Fig. 7 is a vertical section on the line 7 7 of Fig. 1. Fig. 8 is a vertical section of the rotary platform on the line 8 8 of Fig. 2.

In the machine shown the supporting-frame consists of the uprights 1, the upper plate 2, and the base 9. The rotary platform 10 is journaled in the plate 2. Said platform is provided with a series of pockets 11 for receiving the fruit. The gear-wheel 12 is rigid with the platform 10 on the shaft 13. The wheel 14 is provided with a pin 15 for acting against the teeth of the gear-wheel 12. Said wheel 14 is reduced at its lower part 16 adjoining the pin. The wheel 14 is rigid on the shaft 17, which is journaled in the bearing-block 18, secured to the plate 2, and also in the bearing-block 19, secured to the base 9. The bevel-gear 20 is rigid on said shaft 17. The bevel-gear 21 is rigid on the shaft 22 and meshes with the bevel-gear 20. The shaft 22 is journaled in the bearing-blocks 23 and 24, which are secured to the base 9. The gear-wheel 25 is rigid on the shaft 22 and meshes with the gear-wheel 26, which is rigid on the shaft 27. The shaft 27 is journaled in the bearing-blocks 28, 29, and 30. Said shaft is provided with a crank 31, pivotally connected to the plunger 32 through the connecting-rod 33. The plunger 32 is longitudinally slidable in the sleeve 34, secured to the plate 2. The wheel 35 is rigid on the shaft 27. Said wheel is provided with a crank-pin 36, to which the connecting-rod 37 is pivoted. The upper end of the rod 37 is pivoted to the crank-arm 38. Said crank-arm is journaled in the upright 39, which is rigidly secured to the plate 2. The sleeve 40 is connected to the crank-arm 38 by means of the pivoted link 41. The plunger 42 is carried by said sleeve 40. Said plunger is vertically slidable within said sleeve and is secured thereto by means of the spring 43. Said spring is secured at its upper end to the sleeve 40 and at its lower end to the shoulder 44 on said plunger. The sleeve 40 is vertically slidable in the projection 45 on the upright 39. The fork 46 is rigidly secured to the upright 39.

The trough 47 is secured to the plate 2 below the rotary platform 10 and immediately under the plunger 42. The trough 48 is secured upon the plate 2 at the side of the platform 10 near the plunger 32. Said trough 48 is provided with the extended side pieces 49, which pass above the platform 10, as shown in Figs. 1 and 2.

The annular flange 50 is secured upon the platform 10 inward of the pockets 11. Said pockets are formed in the bushings 51, which are threaded into suitable apertures in the platform 10. Said bushings are each provided with a contracted aperture 52, passing through the bushing from the bottom of said pocket. The mouth of each pocket is widened toward the top, as shown in Fig. 8. A rim 53, of hardened material, is seated in the bushing surrounding said aperture. The bushings are provided with sockets 54, adapted for receiving a key for screwing the bushing into or out of its seat. In practice I prefer to make said bushings and platform of copper, while the rim 53 is made of hardened steel. The purpose of making said rim of hardened steel is to avoid wear at this part of the socket through the action of the plunger.

The drive-wheel 55 is rigid on the shaft 22. Said wheel is provided with a crank-handle 56 for turning same, and thus driving the machine by hand. The machine may also be driven by a belt connecting the wheel 55 with suitable power.

Figs. 2 and 8 show some of the pockets containing olives, (represented by the reference-number 57.)

The operation of the device shown is as follows: The operator will insert the fruit in the pockets at the front of the machine. A single revolution of the wheel 55 will cause the plunger 42 to descend and the plunger 32 to ascend, while the platform 10 is at rest. Immediately after the withdrawal of said plungers from the platform and during the return stroke of said plungers the platform will be turned sufficiently to bring different pockets in line with said plungers. Thus with two revolutions of the wheel 55 a pocket will be advanced from the plunger 42 to the plunger 32, as may be seen by reference to Figs. 1 and 2. The shaft 22 through the bevel-gears 21 and 20 will turn the shaft 17, which through the gearing described will intermittently rotate the platform 10. The shaft 27 will be driven through the gear-wheels 25 and 26 and will operate the plungers 32 and 42 through the connections before described. The plunger 42 will perforate the fruit and force its pit through the aperture 52, said pit falling into the trough 47. The plunger 32 will throw the fruit out of the pocket and into the trough 48. The object of the flange 46 and the side pieces 49 on the trough is to assist in guiding the fruit into the trough 48. If the fruit should adhere to the plunger 42 on its upward stroke, the same will be removed by means of the fork 46 and will drop back into the pocket. If one of the pits should be of unusual size or shape and should fail to pass through the aperture 52, the plunger 42 will yield by sliding upwardly in the sleeve 40 against the action of the spring 43. Such pit will be afterward thrown out by means of the plunger 32. Bushings with larger pockets may be substituted for handling larger fruit.

It will be understood that numerous details of my device may be altered without departing from the spirit of my invention. I therefore do not confine myself to such details except as hereinafter limited in the claims.

What I claim as my invention, and desire to secure by Letters Patent, is—

1. The combination of a supporting-frame; a traveling platform having pockets for receiving the fruit; said pockets having each a contracted aperture in its bottom; a reciprocating plunger adapted to drive the pit through the fruit and the bottom of its pocket; means for coacting with the plunger for removing the fruit from the plunger, and mechanism whereby the plunger is reciprocated and the platform given a motion which is arrested during the interval between the expulsion of the pit and the removal of the fruit from the plunger, whereby the fruit is returned to its pocket; and means for discharging the fruit from the pocket after the pocket has been advanced from under the plunger.

2. In a fruit-pitting machine, the combination of a supporting-frame; a rotary horizontally-disposed platform journaled in said frame and having pockets concentrically arranged around its axis, for receiving the fruit; said pockets each having a widened mouth at the top and a contracted aperture through the bottom of the platform; a vertically-reciprocating plunger acting downwardly into one of said pockets at a fixed part of the frame and adapted to cut through the fruit and drive the pit through the aperture; means for intermittently rotating the platform so as to advance the next pocket to the plunger after the withdrawal of said plunger from the preceding pocket; and a vertically-reciprocating plunger acting upwardly into the aperture of one of said pockets advanced from the downwardly-acting plunger; and means for operating said plunger; substantially as described.

Signed at Chicago, Illinois, this 8th day of June, 1900.

OSCAR M. WOLFF.

Witnesses:
  WM. R. RUMMLER,
  GLEN C. STEPHENS.